(12) United States Patent
Won et al.

(10) Patent No.: US 10,547,872 B2
(45) Date of Patent: Jan. 28, 2020

(54) ENCODING DEVICE, DECODING DEVICE, AND ENCODING METHOD AND DECODING METHOD THEREOF

(71) Applicant: SAMSUNG ELECTRONICS CO., LTD., Suwon-si (KR)

(72) Inventors: Kwang-hyun Won, Bucheon-si (KR); Chan-yul Kim, Bucheon-si (KR); Sun-il Lee, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 17 days.

(21) Appl. No.: 15/744,597

(22) PCT Filed: Aug. 1, 2016

(86) PCT No.: PCT/KR2016/008441
§ 371 (c)(1),
(2) Date: Jan. 12, 2018

(87) PCT Pub. No.: WO2017/043769
PCT Pub. Date: Mar. 16, 2017

(65) Prior Publication Data
US 2018/0220159 A1 Aug. 2, 2018

Related U.S. Application Data

(60) Provisional application No. 62/216,570, filed on Sep. 10, 2015.

(51) Int. Cl.
*H04N 19/625* (2014.01)
*H04N 19/146* (2014.01)
(Continued)

(52) U.S. Cl.
CPC ......... *H04N 19/625* (2014.11); *H04N 19/146* (2014.11); *H04N 19/159* (2014.11);
(Continued)

(58) Field of Classification Search
CPC ...................................................... H04N 11/04
(Continued)

(56) References Cited

U.S. PATENT DOCUMENTS 8,711,935 B2 4/2014 Kim et al.
8,923,406 B2 12/2014 Mrak et al.
(Continued)

FOREIGN PATENT DOCUMENTS

KR 10-2010-0033676 A 3/2010
KR 10-2014-0027932 A 3/2014

OTHER PUBLICATIONS

Yoon-Jeong Shin et al., "H.264/AVC to MPEG-2 Video Transcoding by using Motion Vector Clustering", The Journal of the Korea Institute of Electronic Communication Sciences, vol. 5, Issue 1, 2010, 9 pages total.
(Continued)

*Primary Examiner* — Anand S Rao
(74) *Attorney, Agent, or Firm* — Sughrue Mion, PLLC

(57) ABSTRACT

An encoding apparatus encoding a bitstream including an image frame is disclosed. The encoding apparatus comprises a selection unit for selecting a plurality of pixels including non-zero transform coefficients in a transform coefficient block constituting an image frame, an inverse transform unit for generating a plurality of groups of code candidates including combinations of codes assignable to the non-zero transform coefficients of the selected plurality of pixels and generating candidate reconstruction blocks by performing an inverse transform on each of the transform coefficient blocks in which the sign is assigned to the non-zero transform coefficients according to the generated plurality of groups of code candidates, a cost calculation unit for calculating a cost on the basis of a pixel value difference between pixel values of a plurality of pixels selected from (Continued)

among the generated candidate reconstruction blocks and pixel values of other pixels adjacent to the selected plurality of pixels and an encoding unit for assigning different predetermined codewords to a plurality of groups of code candidates on the basis of the calculated cost and encoding one codeword of the codewords into encoding information of non-zero transform coefficients of the selected plurality of pixels.

15 Claims, 26 Drawing Sheets

(51) Int. Cl.
*H04N 19/159* (2014.01)
*H04N 19/176* (2014.01)
*H04N 19/182* (2014.01)
*H04N 19/44* (2014.01)
*H04N 19/593* (2014.01)
*H04N 19/70* (2014.01)
*H04N 19/80* (2014.01)

(52) U.S. Cl.
CPC ......... *H04N 19/176* (2014.11); *H04N 19/182* (2014.11); *H04N 19/44* (2014.11); *H04N 19/593* (2014.11); *H04N 19/70* (2014.11); *H04N 19/80* (2014.11)

(58) Field of Classification Search
USPC ........................................ 375/240.02–240.29
See application file for complete search history.

(56) References Cited

U.S. PATENT DOCUMENTS

| | | |
|---|---|---|
| 2003/0123740 A1 | 7/2003 | Mukherjee |
| 2007/0237221 A1* | 10/2007 | Hsu ........................ H04N 19/61 |
| | | 375/240.03 |
| 2013/0044808 A1 | 2/2013 | Nakagawa et al. |
| 2015/0215648 A1 | 7/2015 | Wang et al. |

OTHER PUBLICATIONS

Il-Koo Kim et al., "HM9: High Efficiency Video Coding (HEVC) Test Model 9 Encoder Description", JCT-VC Video Subgroup, ISO/IEC JTC1/SC29/WG11 MPEG 2012/N13154 Oct. 2012, Shanghai, China, 36 pages total.
Jumpei Koyama et al., "Coefficient Sign Bit Compression in Video Coding", Picture Coding Symposium, Kraków, Poland, May 7-9, 2012, 4 pages total.
Int. Search Report dated Dec. 14, 2016 issued by the Int. Searching Authority in counterpart Application No. PCT/KR2016/008441 (PCT/ISA/210).
Written Opinion dated Dec. 14, 2016 issued by the Int. Searching Authority in counterpart Application No. PCT/KR2016/008441 (PCT/ISA/237).
Communication dated May 24, 2018, from the European Patent Office in counterpart European Application No. 16844589.8.
Jumpei Koyama et al. "Coefficient Sign Bit Compression in Video Coding" 2012 Picture Coding Symposium, May 7-9, 2012 (pp. 385-388).

* cited by examiner

| a | b | c | d |
|---|---|---|---|
| e | f | g | h |
| i | j | k | l |
| m | n | o | p |

FIG. 9

| sign | | cost |
|---|---|---|
| 1st | 2nd | |
| + | + | 25 |
| + | − | 34 |
| − | + | 31 |
| − | − | 21 |

Sorting →

| sign | | cost |
|---|---|---|
| 1st | 2nd | |
| − | − | 21 |
| + | + | 25 |
| + | − | 34 |
| − | + | 53 |

FIG. 10

| Assume : Original Sign(−, −) | | | | |
|---|---|---|---|---|
| sign | | cost | Codeword | |
| 1st | 2nd | | | |
| − | − | 21 | 0 | Signal "0" → |
| + | + | 25 | 10 | |
| + | − | 34 | 110 | |
| − | + | 53 | 1110 | |

FIG. 11A (a) Transformed coefficient in 4 x 4 TV (b) $T^{-1}$ ... $= C_1$ (c) $T^{-1}$ ... $= C_2$ (d) $T^{-1}$ ... $= C_3$

FIG. 11B $$\text{T}^{-1} \begin{Bmatrix} 0 & 8 & 0 & 0 \\ 2 & 0 & 0 & 0 \\ 0 & 0 & 1 & 1 \\ 3 & 0 & 0 & 0 \end{Bmatrix} = C_3 + C_1 + C_2$$

Reconstructed for (+,+)

FIG. 11C $= C_3 + C_1 - C_2$

Reconstructed for (+, −)

FIG. 11D $T^{-1}$ { 
| 0 | -8 | 0 | 0 |
| 2 | 0 | 0 | 0 |
| 0 | 0 | 1 | 1 |
| 3 | 0 | 0 | 0 |
} $= C_3 - C_1 + C_2$

Reconstructed for $(-,+)$

FIG. 11E $$T^{-1} \begin{cases} \begin{bmatrix} 0 & -8 & 0 & 0 \\ -2 & 0 & 0 & 0 \\ 0 & 0 & 1 & 1 \\ 3 & 0 & 0 & 0 \end{bmatrix} = C_3 - C_1 - C_2 \end{cases}$$

Reconstructed for (−, −)

FIG. 12A (a)

Transformed coefficient in 4 x 4 TV (b) $T^{-1}$ = $A_1$ (c) $T^{-1}$ = $C_1$ (d) $T^{-1}$ = $C_2$

FIG. 12B

FIG. 12C $$T^{-1} \begin{Bmatrix} 0 & -8 & 0 & 0 \\ -2 & 0 & 0 & 0 \\ 0 & 0 & 1 & 1 \\ 3 & 0 & 0 & 0 \end{Bmatrix} = A_2 - (C_2 \times 2) = A_3$$

| Case | sign | |
|---|---|---|
| | Hor | Ver |
| 1 | + | + |
| 2 | + | − |
| 3 | − | + |
| 4 | − | − |

FIG. 15

| Case | sign | | Boundary |
| --- | --- | --- | --- |
| | Hor | Ver | Matching Error |
| 0 | + | + | 200 |
| 1 | + | − | 25 |
| 2 | − | + | 100 |
| 3 | − | − | 34 |

↓ Sorting

| Case | sign | | Boundary |
| --- | --- | --- | --- |
| | Hor | Ver | Matching Error |
| 1 | + | − | 25 |
| 3 | − | − | 34 |
| 2 | − | + | 100 |
| 0 | + | + | 200 |

FIG. 16

| Assume : Original Sign (+, −) | | | | |
|---|---|---|---|---|
| Case | sign | | Boundary | Assign |
| | Hor | Ver | Matching Error | Codeword |
| 1 | + | − | 25 | 0 |
| 3 | − | − | 34 | 10 |
| 2 | − | + | 100 | 110 |
| 0 | + | + | 200 | 1110 |

Signal "0" →

ENCODING DEVICE, DECODING DEVICE, AND ENCODING METHOD AND DECODING METHOD THEREOF

TECHNICAL FIELD

The present invention pertains to an encoding apparatus, a decoding apparatus, an encoding method, and a decoding method thereof and, more particularly, to an encoding apparatus, a decoding apparatus which may improve compression performance and an encoding/decoding method thereof.

BACKGROUND ART

In recent years, there has been an increasing demand for high resolution and high quality video such as High Definition (HD) video and Ultra High Definition (UHD) video in various fields. The data amount of the image data increases in order to provide a high-quality and high-resolution image. Therefore, compared with the existing image data processing method, the transmission cost and the storage cost of the image data for providing a high-resolution and high-quality image are increased. Therefore, high-efficiency image compression techniques can be utilized to solve such problems as image data come to have high-resolution and high-quality.

In the meantime, a conventional encoding/decoding technique based on H.264, HEVC, or the like is a technique of allocating sign information of a pixel including a non-zero transform coefficient of a transform coefficient block to one bit per pixel compression was performed. However, in case of the conventional art, the code information of the pixels including at least one non-zero transform coefficient selected in the transform coefficient block needs to be compressed and signaled to a decoding device and thus, there is a problem that the compression efficiency is low.

Therefore, we propose a solution to efficiently compress the sign (or differential motion vector) of the transform coefficients of each pixel having non-zero integer values in the transform coefficient block.

DETAILED DESCRIPTION

Technical Tasks

An object of the present invention is to provide a coding apparatus and a decoding apparatus capable of improving the coding and decoding performance by reducing the number of bits necessary for indicating the sign of the non-zero transform coefficient, and to provide a coding and decoding method therefor.

Means for Solving Problems

According to an exemplary embodiment, an encoding apparatus for encoding a bitstream including an image frame, the encoding apparatus includes a selection unit for selecting a plurality of pixels including non-zero transform coefficients in a transform coefficient block constituting an image frame; an inverse transformation unit for generating a plurality of groups of code candidates including combinations of codes assignable to the non-zero transform coefficients of the selected plurality of pixels and generating candidate reconstruction blocks by performing an inverse transform on each of the transform coefficient blocks in which the sign is assigned to the non-zero transform coefficients according to the generated plurality of groups of code candidates; a cost calculation unit for calculating a cost on the basis of a pixel value difference between pixel values of a plurality of pixels selected from among the generated candidate reconstruction blocks and pixel values of other pixels adjacent to the selected plurality of pixels; and an encoding unit for assigning different predetermined codewords to a plurality of groups of code candidates on the basis of the calculated cost and encoding one codeword of the codewords into encoding information of non-zero transform coefficients of the selected plurality of pixels.

The selection unit may select a predetermined number of pixels in a decreasing order of a transform coefficient value from among the transform coefficient block constituting the image frame.

The encoding unit may allocate a codeword constituting a smallest bits from among the predetermined codeword for a code group having a small cost, and encode a codeword composed of the smallest bits to encoding information of non-zero transform coefficients included in each pixel.

The encoding unit may allocate codeword '0' to a candidate group having the smallest cost.

The inverse transformation unit may generate a restoration block in which an inverse transform is performed for each block where transform coefficients included in remaining pixels other than each of the selected pixel from among the transform coefficient blocks are replaced with zero and a restoration block in which inverse transform is performed on a block where all the selected pixels from among the transformed coefficient block are replaced with zero, and generate a candidate block through the sum or difference of the reconstructed blocks generated.

The cost calculation unit may calculate boundary matching cost based on a difference between pixel values of a plurality of pixels selected from the candidate restoration blocks and pixel values of other pixels in pre-restored another block adjacent to the selected plurality of pixels.

The cost calculation unit may calculate a variance cost based on the pixel value difference between adjacent pixels within the candidate reconstruction block.

According to an exemplary embodiment, an encoding method includes selecting a plurality of pixels including non-zero transform coefficients in a transform coefficient block constituting an image frame; generating a plurality of groups of code candidates including combinations of codes assignable to the non-zero transform coefficients of the selected plurality of pixels and generating candidate reconstruction blocks by performing an inverse transform on each of the transform coefficient blocks in which the sign is assigned to the non-zero transform coefficients according to the generated plurality of groups of code candidates; calculating a cost on the basis of a pixel value difference between pixel values of a plurality of pixels selected from among the generated candidate reconstruction blocks and pixel values of other pixels adjacent to the selected plurality of pixels; and assigning different predetermined codewords to a plurality of groups of code candidates on the basis of the calculated cost and encoding one codeword of the codewords into encoding information of non-zero transform coefficients of the selected plurality of pixels.

The selecting may include selecting a predetermined number of pixels in a decreasing order of a transform coefficient value from among the transform coefficient block constituting the image frame.

The encoding may include allocating a codeword constituting a smallest bits from among the predetermined codeword for a code group having a small cost, and encoding a codeword composed of the smallest bits to encoding information of non-zero transform coefficients included in each pixel.

The encoding may include allocating codeword '0' to a candidate group having the smallest cost.

The generating may include generating a restoration block in which inverse transform is performed for each block where transform coefficients included in remaining pixels other than each of the selected pixel from among the transform coefficient blocks are replaced with zero and a restoration block in which inverse transform is performed on a block where all the selected pixels from among the transformed coefficient block are replaced with zero; and generating a candidate block through the sum or difference of the reconstructed blocks generated.

The calculating may include calculating boundary matching cost based on a difference between pixel values of a plurality of pixels selected from the candidate restoration blocks and pixel values of other pixels in pre-restored another block adjacent to the selected plurality of pixels.

The calculating may include calculating a variance cost based on the pixel value difference between adjacent pixels within the candidate reconstruction block.

A decoding apparatus for decoding a bitstream including an image frame includes a parsing unit for parsing a codeword encoded with sign information of non-zero transform coefficients included in a plurality of pixels selected from a transform coefficient block constituting an image frame; a selection unit for selecting a plurality of pixels to be decoded in a transform coefficient block constituting an image frame; an inverse transformation unit for generating a plurality of groups of code candidates including combinations of codes assignable to the non-zero transform coefficients of the selected plurality of pixels and generating candidate reconstruction blocks by performing an inverse transform on each of the transform coefficient blocks in which the sign is assigned to the non-zero transform coefficients according to the generated plurality of groups of code candidates; a cost calculation unit for calculating a cost on the basis of a pixel value difference between pixel values of a plurality of pixels selected from among the generated candidate reconstruction blocks and pixel values of other pixels adjacent to the selected plurality of pixels; and a decoding unit for allocating predetermined different codewords to each of the plurality of code candidates based on the calculated cost, and determining a code of the non-zero transform coefficients of the selected plurality of pixels according to a candidate group to which a codeword corresponding to the parsed codeword is allocated.

The selection unit may select a predetermined number of pixels in a decreasing order of a coefficient value in a predetermined area from among transformation coefficient blocks constituting the image frame.

In addition, the decoding unit may allocate a codeword having the smallest bits from among the predetermined codewords for a candidate group having the smallest cost from among the plurality of candidate groups.

Effect of Invention

According to various embodiments of the present invention described above, the size of information indicating the sign of the pixel value of the non-zero transform coefficient can be reduced, and the moving image compression performance can be improved.

BRIEF DESCRIPTION OF DRAWINGS

FIGS. 7 and 8 are views to describe a method for calculating a boundary matching cost according to various exemplary embodiments, FIG. 9 is a view to describe a method for arranging a code candidate based on a cost calculated according to an exemplary embodiment, FIG. 10 is a view to describe a method for determining and signaling a code candidate according to an exemplary embodiment, FIGS. 11A to 11E are views to describe a method for generating a candidate restoration block corresponding to each code candidate according to an exemplary embodiment, FIGS. 12A to 12D are views to describe a method for generating a candidate restoration block which corresponds to each code candidate according to another exemplary embodiment, FIGS. 13 to 16 are views to describe a method for encoding an MVD code to a codeword according to an exemplary embodiment.

BEST MODE OF INVENTION

Figure 1:
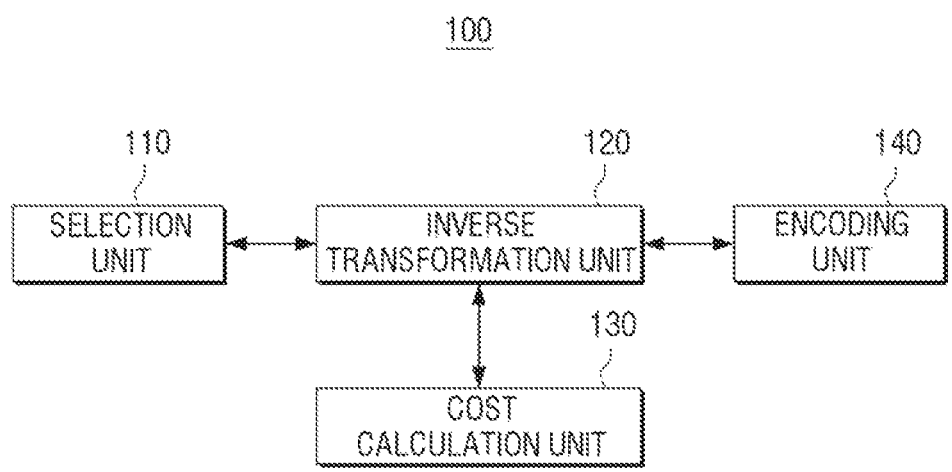
FIG. 1 is a block diagram illustrating a configuration of an encoding device according to an exemplary embodiment.

Exemplary embodiments are described in greater detail below with reference to the accompanying drawings In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments may be practiced without those specifically defined matters. Also, well-known functions or constructions are not described in detail since they would obscure the description with unnecessary detail.

The terms such as "first," "second," and so on may be used to describe a variety of elements, but the elements should not be limited by these terms. The terms are used only for the purpose of distinguishing one element from another.

A singular expression includes a plural expression, unless otherwise specified. It is to be understood that the terms such as "comprise" or "consist of" are used herein to designate a presence of characteristic, number, step, operation, element, component, or a combination thereof, and not to preclude a presence or a possibility of adding one or more of other characteristics, numbers, steps, operations, elements, components or a combination thereof.

In the example embodiments of the present disclosure, a 'module' or a 'unit' may perform at least one function or operation, and be implemented as hardware (e.g., circuitry) or software, or as a combination of hardware and software. Further, except for the 'module' or the 'unit' that has to be implemented as particular hardware (e.g., a dedicated processor), a plurality of 'modules' or a plurality of 'units' may be integrated into at least one module and implemented as at least one processor.

Hereinbelow, the present invention will be further detailed with reference to the drawings.

FIG. 1 is a block diagram illustrating a configuration of an encoding apparatus according to an embodiment of the present invention. Referring to FIG. 1, an encoding apparatus 100 includes a selection unit 110, an inverse transformation unit 120, a cost calculation unit 130, and an encoding unit 140.

The selection unit 110 selects a plurality of pixels including non-zero transform coefficients in a transform coefficient block constituting an image frame. The selection unit 110 can select a predetermined number of pixels in order of the decreasing transform coefficient value to the least in a predetermined region among the transform coefficient blocks constituting the image frame.

The inverse transformation unit 120 generates a plurality of code candidates including combinations of codes assignable to the non-zero transform coefficients of the selected plurality of pixels. That is, the inverse transformation unit 120 removes the sign of the non-zero transform coefficients of the selected plurality of pixels, and may generate code candidates as many as the number of cases regarding the combination of assignable signs (+ or −) for the non-zero transform coefficients of the pixels from which the sign is removed.

For example, if the number of pixels selected by the selection unit 110 is two, the combination of codes assignable to each pixel is (+, +), (+, −), (−, +), and (−, −) and thus, four code candidates can be generated. Likewise, if the number of selected pixels is 5, 25 code combinations are possible, and thus 25 code candidates can be generated.

The inverse transformation unit 120 may perform inverse transformation on each transform coefficient block to which the code is assigned to the non-zero transform coefficients according to the generated plurality of code candidates to generate candidate restoration blocks.

The cost calculation unit 130 calculates the cost based on the difference between the pixel values of the selected plurality of pixels and the pixel values of other pixels adjacent to the selected plurality of pixels, among the generated candidate restoration blocks. Specifically, the cost calculation unit 130 may calculate matching error for each candidate restoration block based on co-relation between the pixel value of the selected plurality of pixels from among the generated candidate restoration block and the pixel value of another pixel within the pre-stored other block adjacent to the selected plurality of pixels.

The matching error based on the co-relation is calculated as a specific cost based on the difference between the pixel value of the selected plurality of pixels and the pixel value of the other pixel in the pre-restored other block adjacent to the selected plurality of pixels. The cost that is calculated at this time may also be referred to as a boundary matching cost.

The encoding unit 140 allocates a predetermined codeword to each of the plurality of code candidates based on the calculated cost and encodes one codeword, from among the codewords allocated to each signal candidate group, as encoding information of the non-zero transform coefficients of the selected plurality of pixels. Here, the codeword can be implemented as a unary code such as 0, 10, 110, and 1110. However, there is no restriction on the implementation method of the codeword, and it can be implemented in various ways including the VLC code.

The encoding unit 140 may allocate codeword '0' for the code group having the lowest cost. In the order of lower cost, the codewords such as '0', '10', '110' and '1110' can be allocated.

Figure 2:
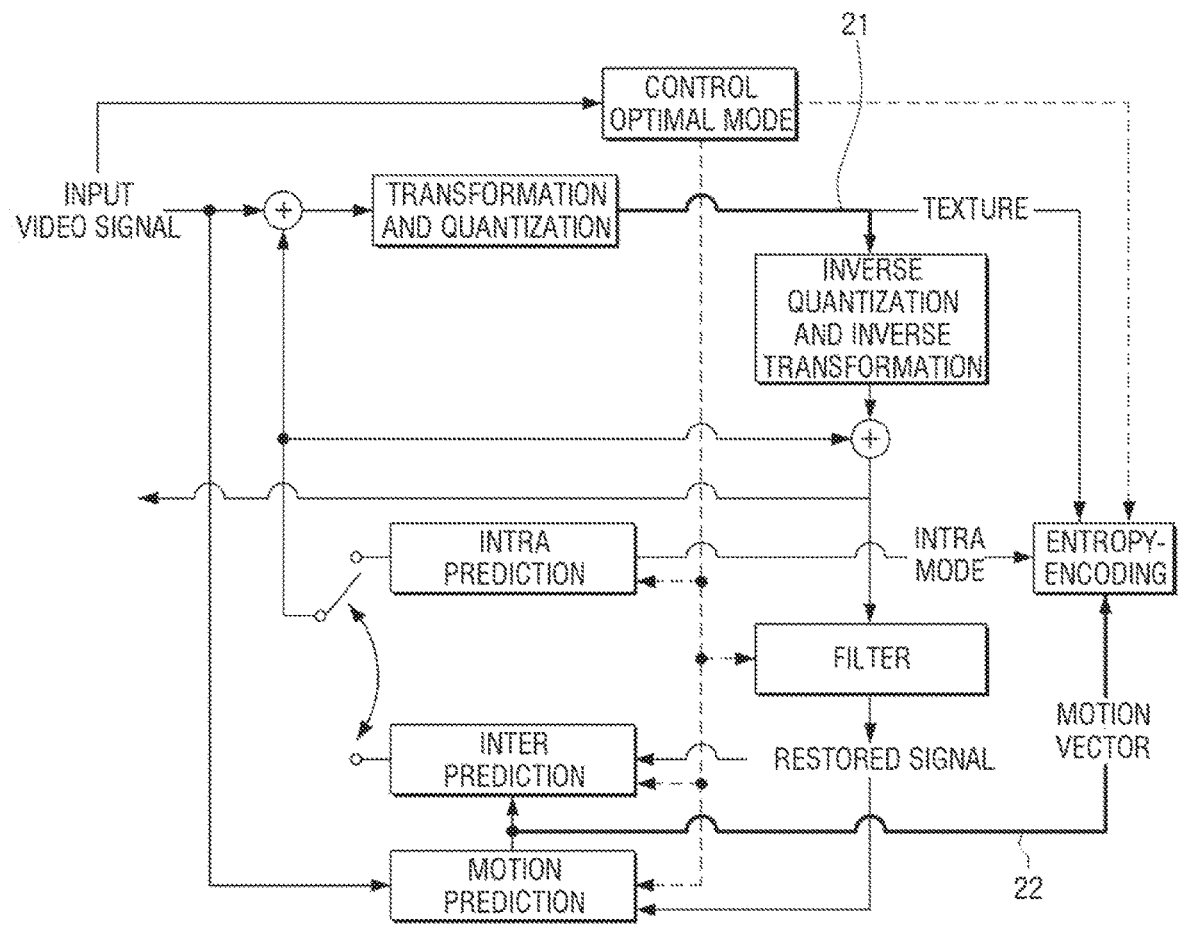
FIG. 2 is a block diagram illustrating an encoding process according to an exemplary embodiment.

FIG. 2 is a block diagram illustrating an encoding process according to an exemplary embodiment.

The encoding apparatus 100 may encode an input image in an optimal mode, such as an intra-mode or an inter mode, and output a bit stream. Intra prediction indicates prediction in a screen, and inter prediction indicates prediction between screens. In the intra mode, the switch is switched to the intra mode, and in the inter mode, the switch is switched to the inter mode. The encoding apparatus 100 may generate a prediction block for an input block of an input image and then encode the difference between the input block and the prediction block.

In the intra mode, the encoding apparatus 100 can generate a prediction block by performing spatial prediction using the pixel value of the already coded block around the current block.

In the inter mode, the encoding apparatus 100 can obtain a motion vector by searching an area of the reference image stored in the reference image buffer 190 that is best matched with the input block in the motion prediction process.

Meanwhile, a residual block is generated by subtracting the input block and the generated prediction block by a subtractor, and the residual block is transformed to output a transform coefficient. At this time, the input transform coefficient is quantized by the quantization parameter, and a quantized coefficient may be output.

The encoding unit 140 may output a bit stream by entropy encoding a symbol according to a probability distribution based on the values calculated through quantization or the encoding parameter values calculated in the encoding process.

Here, the symbol means a syntax element to be encoded/decoded, a coding parameter, a value of a residual signal, and the like. The encoding parameters are parameters necessary for encoding and decoding and may include not only the information encoded in the encoding apparatus 100 and transmitted to the decoding apparatus 200 such as syntax elements but also information that can be inferred in the encoding or decoding process. This means information necessary for encoding or decoding an image. The encoding parameters include, for example, values such as intra/inter prediction mode, motion/motion vector, reference image index, encoding block pattern, residual signal presence, transform coefficient, quantized transform coefficient, quantization parameter, block size, block split information, or statistics can be included. Also, the residual signal may mean a difference between the original signal and the prediction signal, or a signal in which the difference between the original signal and the prediction signal is transformed, or a signal in which the difference between the original signal and the prediction signal is transformed. The residual signal may be referred to as a residual block in block units.

When entropy encoding is applied, a small number of bits are allocated to a symbol having a high probability of occurrence, and a large number of bits are allocated to a symbol having a low probability of occurrence, so that the size of the bit stream for the symbols to be encoded is reduce. Therefore, the compression performance of image encoding can be enhanced through entropy encoding.

For the entropy encoding, an encoding method such as exponential golomb, Context-Adaptive Variable Length Coding (CAVLC), and Context-Adaptive Binary Arithmetic Coding (CABAC) may be used. For example, the coding unit 140 may store a table for performing entropy coding such as a variable length coding/coding (VLC) table, and the coding unit 140 may include a variable length coding (VLC). Table can be used to perform entropy encoding. The encoding unit 140 derives a binarization method of the object symbol and a probability model of the object symbol/bin, and then performs entropy encoding using the derived binarization method or probability model.

Quantized coefficient can be reverse-quantized and reverse-transformed. The reverse-quantized and reverse-transformed coefficient can be added with the prediction block through the adder and a restoration block can be generated.

The restoration block passes a filter and a filter may apply at least one of a deblocking filter, sample adaptive offset (SAO), and an adaptive loop filter (ALF) to a restoration block or a restoration picture. The restoration block which passes the filter may be stored in a reference image buffer.

Meanwhile, the operations of selecting a plurality of pixels including non-zero transform coefficients, generating a plurality of code candidates, and calculating a cost are performed between the transform and quantization step and the inverse quantization and inverse transform step 21, and the operation of performing the inverse transform to generate the candidate restoration block may be performed in the inverse transformation step.

The selection unit 110 and the cost calculation unit 130 may be configured to perform operations between (21) the transformation and quantization steps, and when the selection unit 110 and the cost calculation unit 130 are configured to perform an operation in the reverse transformation unit 140, the selection unit 110 and the cost calculation unit 130 may be named as the reverse transformation unit 140 which is separated from other elements.

Figure 3:
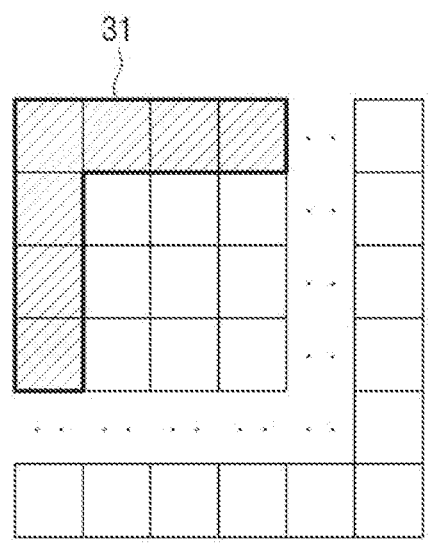
FIG. 3 is a flowchart to describe a process for signaling a codeword corresponding to an original code in an encoding device according to an exemplary embodiment.

FIG. 3 is a flowchart to describe a process for signaling a codeword corresponding to an original code in an encoding device according to an exemplary embodiment.

First, a sign candidate to be encoded is selected (S41). Here, it is possible to select a predetermined number of pixels in order of greater transformation coefficient values in a predetermined area among the transform coefficient blocks constituting the image frame.

Then, a cost corresponding to the code candidates is calculated (S42). The cost may be calculated based on the pixel value difference between a pixel value of a plurality of selected pixels among the candidate reconstruction blocks generated according to the selected plurality of code candidate groups and another pixel adjacent to the selected plurality of pixels. At this time, the cost is determined by a method (boundary matching cost) based on the difference between pixel values at the boundary between the generated candidate reconstructed block and another adjacent restored block or a method of calculating a pixel value can be calculated by a method based on difference (variance cost).

Thereafter, a codeword is allocated to the aligned code candidate (S43). Different codewords which are preset may be allocated to the aligned codeword groups, and a codeword having the smallest number of codewords may be assigned to the candidate group having the smallest cost among the plurality of codewords. A codeword having the smallest number of bits is encoded into sign information of non-zero transform coefficients included in each pixel. In particular, a codeword '0' can be assigned to the candidate group having the smallest cost.

Then, a codeword corresponding to the original code is signaled (S44).

Figure 4:
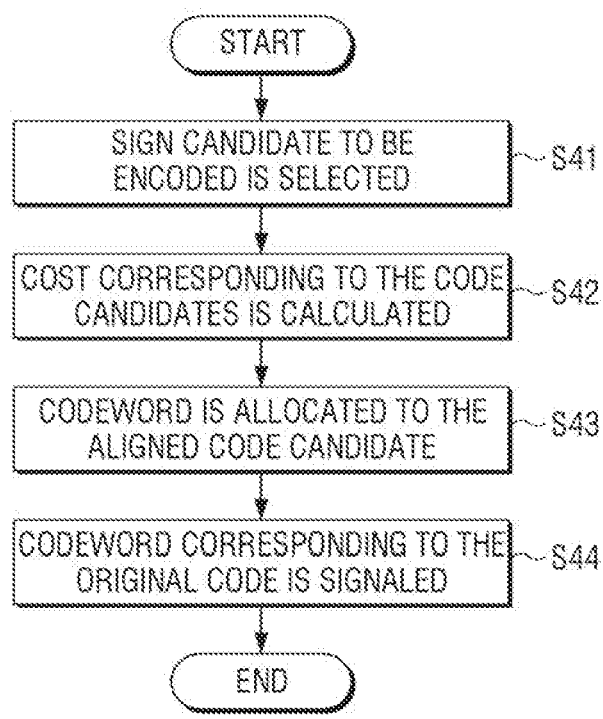
FIG. 4 is a view to illustrate a method to select a code candidate for encoding according to an exemplary embodiment.

FIG. 4 is a diagram for describing a method of selecting a code candidate to be encoded according to an embodiment of the present invention. The selection unit 110 may designate a specific region to select a plurality of pixels including non-zero transform coefficients to be encoded. Here, a plurality of pixels including the selected non-zero transform coefficient corresponds to a pixel for encoding the sign information of the transform coefficient of the pixel into the codeword. As shown in FIG. 4, the selection unit 110 may select a DC element area 31 in which energy is relatively concentrated in a transform coefficient block for which discrete cosine transform (DCT) and quantization are performed as an area for select a plurality of pixels which include non-zero transform coefficient.

The selection unit 110 can select a predetermined number of pixels in the designated area 31 in order of greater transform coefficient values. Preferably, the selection unit 110 can select three to five pixels in the designated area 31. However, the number of pixels to be selected may be varied according to various conditions of the transform coefficient block, and the following table shows the most efficient selection number according to the luminance component, chrominance component, and TU size in the intra CU and the inter CU.

TABLE 1

|  | TU size | Intra CU | Inter CU |
| --- | --- | --- | --- |
| Luma | 4 × 4 | Not Used | up to 5 |
|  | 8 × 8 | up to 3 | up to 5 |
|  | 16 × 16 | up to 4 | up to 5 |
|  | 32 × 32 | up to 4 | up to 5 |
| Chroma | 4 × 4 | up to 3 | up to 5 |
|  | 8 × 8 | up to 3 | up to 5 |
|  | 16 × 16 | up to 3 | up to 5 |

Figure 5:
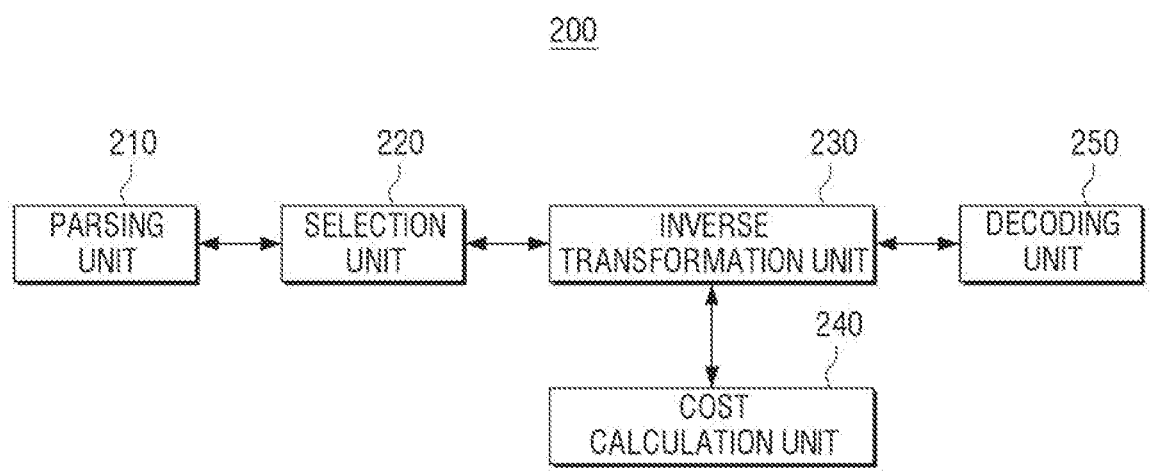
FIG. 5 is a block diagram illustrating a configuration of a decoding device according to an exemplary embodiment.

FIG. 5 is a block diagram illustrating a configuration of a decoding apparatus according to an embodiment of the present invention. Referring to FIG. 5, the decoding apparatus 200 includes a parsing unit 210, a selection unit 220, an inverse transformation unit 230, a cost calculation unit 240, and a decoding unit 250.

The parsing unit 210 parses a codeword encoded with sign information of non-zero transform coefficients included in a plurality of pixels selected from a transform coefficient block constituting an image frame.

The selection unit 220 selects a plurality of pixels to be decoded in a transform coefficient block constituting an image frame. The selection unit 220 of the decoding apparatus 200 has the same operation as the selection unit 110 of the encoding apparatus 100. The selection unit 220 can select a predetermined number of pixels in order of greater transform coefficient value in the predetermined region among the transform coefficient blocks constituting the image frame.

The inverse transformation unit 230 generates a plurality of candidate groups including combinations of codes assignable to the non-zero transform coefficients of the plurality of pixels selected by the selection unit 220, and outputs the non-zero transform coefficients according to the generated plurality of code candidates. Inverse transform is performed on each transform coefficient block to which the sign is assigned to the transform coefficients to generate candidate restored blocks. The operation of the inverse transformation unit 230 is the same as the operation of the inverse transformation unit 120 of the encoding apparatus 100 and the operation of the inverse transformation unit 120 of the encoding apparatus 100 has been described with reference to FIG. 1 and will not be further described.

The cost calculation unit 240 calculates the cost based on the pixel value difference between the pixel values of the selected plurality of pixels and the other pixels adjacent to the selected plurality of pixels, among the generated candidate restoration blocks. The cost calculation unit 240 is also identical in operation to the cost calculation unit 130 of the encoding apparatus 100, and a detailed description thereof will be omitted.

The decoding unit 250 allocates a predetermined codeword to each of the plurality of code candidates based on the calculated cost, and determines a code of the non-zero transform coefficients of the selected plurality of pixels according to a candidate group to which a codeword corresponding to the parsed codeword is allocated. The decoding unit 250 performs an operation opposite to the encoding unit 140 of the encoding apparatus 100 to decode the bitstream including the image frame.

Figure 6:
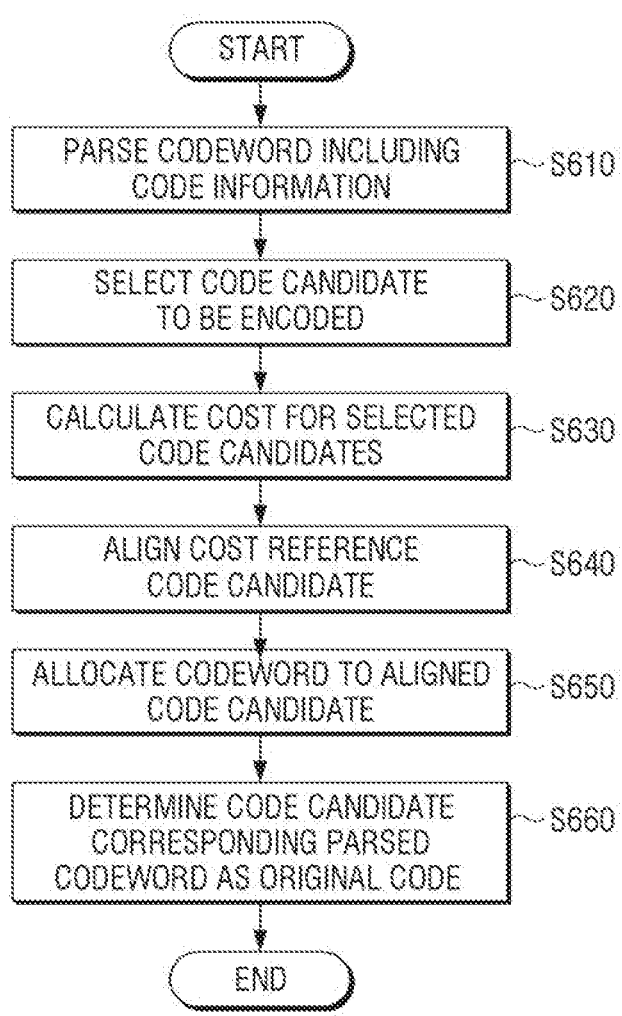
FIG. 6 is a flowchart to describe a process for determining an original code in a decoding device according to an exemplary embodiment.

FIG. 6 is a flowchart illustrating a process of determining an original code in a decoding apparatus according to an embodiment of the present invention. The decoding process of the decoding apparatus 200 may be configured in the reverse order to the encoding process of the encoding apparatus 100 described in FIG. 4.

First, from bit stream received from the encoding apparatus, codeword which includes code information of the non-zero transform coefficients is parsed (S610).

Hereinafter, an operation S620 of selecting a code candidate to be encoded from non-zero transform coefficients that do not include code information, an operation S630 of calculating a cost for selected code candidates, an operation S640 of aligning code candidate based on the calculated cost, and an operation S650 of assigning a codeword to the aligned code candidate are the same as those of the encoding apparatus 100 described with reference to FIG. 4, so the detailed description is omitted.

Then, the code candidate corresponding to the parsed codeword is determined as an original code S660. According to the code candidate which is determined as the original code, a code can be allocated for the non-zero transform coefficient not including a code.

An operation of S620 to an operation of S650 may be pre-processed after parsing of the codeword and before the step of S610.

Figure 7:
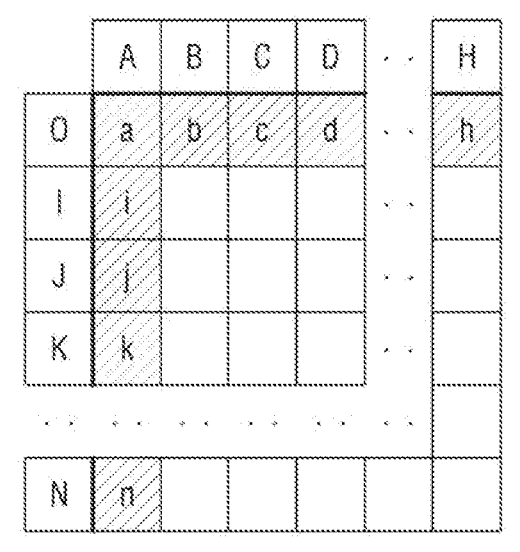
Figure 8:
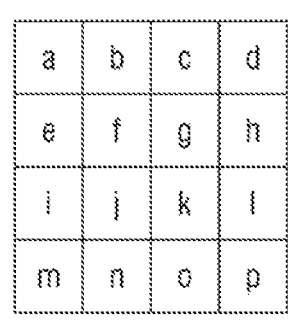

FIGS. 7 and 8 are views to describe a method for calculating a boundary matching cost according to various exemplary embodiments.

According to an exemplary embodiment of FIG. 7, the cost calculation unit 130 may calculate a boundary matching cost based on a difference between a pixel value of a plurality of selected pixels among the generated candidate restoration blocks and a pixel value of other pixels in pre-restored another block adjacent to the selected plurality of pixels.

Specifically, as shown in FIG. 7, the selection unit 110 of the encoding apparatus 100 can set an area for selecting a predetermined number of pixels in the transform coefficient block. Here, the predetermined region is preferably a DC component region in which energy is relatively concentrated in a Discrete Cosine Transform (DCT) and a transform coefficient block on which quantization is performed. In the embodiment shown in FIG. 7, the pixels (a to n) existing in the first row and the first column of the transform coefficient block are set as an area for selecting a predetermined number of pixels.

The inverse transformation unit 120 may generate a plurality of code candidates including combinations of codes assignable to the non-zero transform coefficients of the predetermined number of pixels selected in the corresponding region a to n, and generate a candidate restoration block by performing inverse transformation on the transform coefficient block to which the code according to the code candidate group is assigned.

At this time, the cost calculation unit 130 may calculate the cost based on the difference between the pixel values of the selected plurality of pixels and the pixel values of other pixels adjacent to the selected plurality of pixels, among the generated candidate restoration blocks. In an embodiment of FIG. 7, the cost calculation unit 130 may calculate the cost of the selected pixel among the a to n pixel areas of each generated candidate restoration block and the pixel values of the other pixels A To N. The cost calculated according to this method will be referred to as a boundary matching cost.

To be specific, boundary matching cost according to an exemplary embodiment may be calculated by the equation as shown below.

$$\text{Boundary Matching Cost}=|a-A|+|b-B|+|c-C|+ \ldots +|n-N|| \quad [\text{Equation 1}]$$

In addition, the boundary matching cost according to another exemplary embodiment can be calculated by the equation as shown below.

$$\text{Boundary Matching Cost}=(a-A)^2+(b-B)^2+(c-C)^2+ \ldots +(n-N)^2 \quad [\text{Equation 2}]$$

In other words, when the pixels which are in a boundary with the pre-restored other blocks are selected as pixels to generate a code candidate group in a transform coefficient block, the encoding apparatus 100 may calculate boundary matching cost based on the difference of the pixel values of the transform coefficient block and pixels adjacent to each other on a boundary of pre-restored other blocks. Here, it is highly likely that the candidate restoration block with the smallest boundary matching cost can be original transform coefficient block before a code is removed. Accordingly, the encoding unit 140, for the code candidate group of the candidate restoration block with the smallest boundary matching cost, may encode the codeword composed of the smallest bit number as the code information.

FIG. 8 illustrates a method for calculating a cost according to another exemplary embodiment.

As shown in FIG. 8, the cost calculation unit 130 may calculate a cost by calculating a variance value based on a pixel value difference between adjacent pixels in the generated candidate restoration block. The cost calculated in this way is called the variance cost.

To be specific, the variance cost according to an exemplary embodiment may be calculated by the equation as shown below.

$$\text{variance cost}=|a-b|+|c-d|+|e-f|+ \ldots +|o-p| \quad [\text{Equation 3}]$$

That is, the cost calculation unit 130 can calculate the variance cost as a measure indicating the degree of similarity between the pixel values of the pixels in the candidate restoration block. The candidate restoration block having the smallest variance cost has the highest probability to be an original transform coefficient block before a code is removed. Accordingly, the encoding unit 140 may encode the codeword consisting of the smallest bit number from among the preset codewords as code information for the code candidate group of the candidate restoration block having the smallest variance cost.

In conclusion, in the transform coefficient block in both of the embodiments of FIGS. 7 and 8, code information is encoded and decoded stochastically using a cost, which is an index indicating the degree of similarity.

FIG. 9 is a view to describe a method for arranging a code candidate based on a cost calculated according to an exemplary embodiment.

The encoding unit 140 can sort the code candidates based on the calculated cost for the candidate restoration blocks according to the plurality of code candidates. At this time, the encoding unit 140 may sort the code candidates in descending or ascending order based on the cost.

FIG. 9 is a view illustrating that, in the transformation coefficient block, when two non-zero transform coefficient is selected, a code candidate group may be aligned based on the cost which is calculated from the candidate restoration block which corresponds to (+, +), (+, −), (−, +), (−, −), which are the combinations of codes which can be aligned to each non-zero transform coefficient. As shown in FIG. 9, the cost calculated for the code candidate group (−, −) is the smallest at 21, and when the cost is calculated according to the method shown in FIG. 7 or 8, code candidate group (−, −) is the code information of the original transform coefficient block has the highest probability. At this time, the encoding unit 140 can sort the code candidate group so that the code candidate group (−, −) having the smallest cost are arranged at the uppermost positions.

FIG. 10 is a view to describe a method for determining and signaling a code candidate according to an exemplary embodiment.

As shown in FIG. 10, the encoding unit 140 may assign a different unary code to each code candidate group. At this time, the encoding unit 140 can allocate the code word '0' to the code candidate group (−, −) having the smallest cost, and codeword '10' to the code candidate group (+, +) having the second smallest cost. In the similar manner, the encoding unit 140 can allocate the code word 110 to the code candidate group (+, −) having the third smallest cost, and allocate the code word 1110 to the code candidate group (−, +) having the largest cost. In this case, for the code candidate group (−, −), '0' may be omitted from the codeword '1110', and '111' may be allocated.

In the meantime, the method of implementing a codeword is not limited thereto, and the codeword can be implemented as various methods including VLC not a unary code as described above.

FIGS. 11A to 11E are views to describe a method for generating a candidate restoration block corresponding to each code candidate according to an exemplary embodiment.

FIG. 11A shows a method for encoding the sign information of two pixels 111 and 112 including a non-zero transform coefficient in a 4×4 TU into a codeword. When two pixels 111 and 112 for coding sign information are selected in the TU shown in FIG. 11A (a), the inverse transformation unit 120 generates code candidate groups (+,+) (+, −), (−, +), and (−, −) which include the combination of codes assignable to the non-zero transform coefficients of the selected pixel. The combination of the non-zero transform coefficients of the pixels 111 and 112 corresponding to each code candidate group is (+8, +2), (+8, −2), (−8, +2), and (−8, −2).

In this case, as described above, it is possible to generate candidate restoration blocks by performing inverse transform on each transform coefficient block to which the sign is assigned to the non-zero transform coefficients according to each code candidate group. In this case, a total of four inversions must be performed for each transform coefficient block. However, according to the embodiment of FIGS. 11A to 11E, the number of times the inverse transformation is performed can be reduced by using the linear property of the inverse transformation.

As illustrated in FIG. 11A (b), the inverse transformation unit 120 transforms the transform coefficient values of the pixels 113, 114, and 115 having the non-zero transform coefficients except one pixel 111 of the selected pixels to zero. The inverse transformation unit 120 may generate a restored block $C_1$ that is inversely transformed with respect to the generated transform coefficient block.

In the same manner, as illustrated in FIG. 11A (c), the inverse transformation unit 120 transforms the transform coefficient values of the pixels 113, 114, and 115 having the non-zero transform coefficients except for the other pixels 112 of the selected pixels to all zero. The inverse transformation unit 120 may generate the inverse transformed restored block $C_2$ with respect to the transform coefficient block thus generated.

As illustrated in FIG. 11A (d), the inverse transformation unit 120 holds only the transform coefficient values of the pixels 113, 114, and 115 having the non-zero transform coefficients except for the selected pixels 111 and 112. It is possible to generate a transform coefficient block in which all the transform coefficient values of the selected pixels 111 and 112 are replaced with zero. The inverse transformation unit 120 may generate the inverse transformed restoration block $C_3$ with respect to the generated transform coefficient block.

As shown in FIG. 11B, the inverse transform is performed on the transform coefficient block to which the sign is assigned to the non-zero transform coefficients 111 and 112 according to the sign candidate group (+, +), and the generated restoration block is $C_3+C_1+C_2$.

Figure 11C:
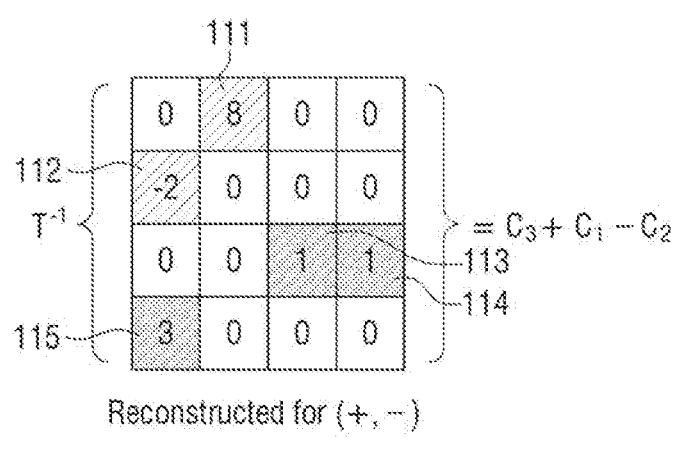

As shown in FIG. 11C, the inverse transform is performed on the transform coefficient block to which the sign is assigned to the non-zero transform coefficients 111 and 112 according to the sign candidate group (+, −), and the generated restoration block is $C_3+C_1-C_2$.

As shown in FIG. 11D, the inverse transform is performed on the transform coefficient block to which the sign is assigned to the non-zero transform coefficients 111 and 112 according to the sign candidate group (−, +), and the generated restoration block is $C_3-C_1+C_2$.

As shown in FIG. 11E, the inverse transform is performed on the transform coefficient block to which the sign is assigned to the non-zero transform coefficients 111 and 112 according to the sign candidate group (−, −), and the generated restoration block is $C_3-C_1-C_2$.

That is, each of the code candidates (+, +), (+, −), (−, +) and (−, −) are calculated using $C_1$, $C_2$, and $C_3$ calculated by performing three inverse transformations in the manner shown in FIGS. 11A (b), (c) and (d). According to this embodiment, since the number of inverse transformations to be performed four times is reduced to three, the load of the encoding apparatus 100 can be reduced and the operation speed can be improved.

FIGS. 12A to 12D are views to describe a method for generating a candidate restoration block which corresponds to each code candidate according to another exemplary embodiment.

FIG. 12A shows a method for encoding the sign information of two pixels 121 and 122 including a non-zero transform coefficient in a 4×4 TU into a codeword. When two pixels 121 and 122 (sign removed) for coding sign information are selected in the TU shown in FIG. 12A (a), the inverse transformation unit 120 generates code candidate groups (+,+), (+,−), (−,+), (−,−) which include the combination of codes assignable to the non-zero transform coefficients of the selected pixel. The combination of the non-zero transform coefficients of the pixels 121 and 122 corresponding to each code candidate group is (+8, +2), (+8, −2), (−8, +2), and (−8, −2).

In the exemplary embodiments of FIGS. 12A to 12D as well, the number of performing inverse transformation using linear property of inverse transformation is reduced.

As illustrated in FIG. 12A (b), the inverse transformation unit 120 may perform inverse transformation and generate the candidate restoration block $A_1$ regarding the transform coefficient block to which the code is assigned to the non-zero transform coefficients 121, 122 according to the code candidate group (+, +).

As illustrated in FIG. 12A (c), the inverse transformation unit 120 may hold only the transform coefficient values of one pixel 122 of the selected pixels, generate transform coefficient block in which all the transform coefficient values of the pixels 121, 123, 124, 125 having non-zero transform coefficients to zero, and generate the restoration block $C_1$ in which inverse transformation is performed with respect to the transform coefficient block.

Similarly, as shown in (d) of FIG. 12A, the inverse transformation unit 120 may hold only the transform coefficient values of one pixel 121 of the selected pixels, generate transform coefficient block in which all the transform coefficient values of the pixels 122, 123, 124, 125 having non-zero transform coefficients to zero, and generate the restoration block $C_1$ in which inverse transformation is performed with respect to the transform coefficient block.

The inverse transformation unit 120 may generate restoration block $A_2$, $A_3$, and $A_4$ for the code candidate group (+, −), (−, −), and (−, +) by using the restoration block $A_1$, $C_1$ and $C_2$.

Figure 12B:
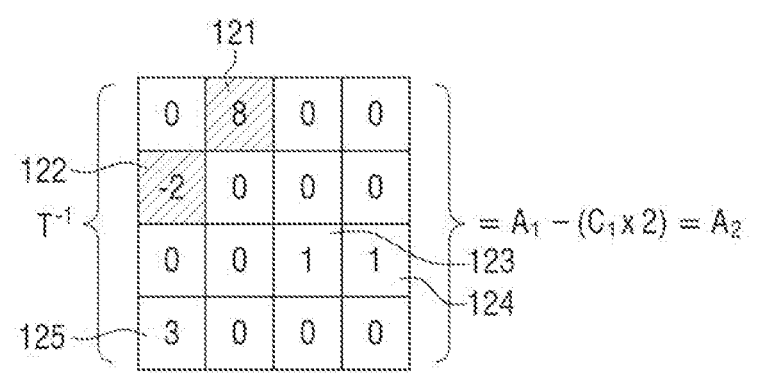

Specifically, as shown in FIG. 12B, the inverse transformation unit 120 may generate a reconstruction block $A_2$ for the code candidate group (+, −) by subtracting a reconstruction block obtained by multiplying each pixel value of the reconstruction block $C_1$ by two in the reconstruction block $A_1$.

In the same manner, as illustrated in FIG. 12C, the inverse transformation unit 120 may generate a restoration block A3 for the code candidate group (−, −) by subtracting a reconstruction block obtained by multiplying each pixel value of the reconstruction block $C_2$ by two in the reconstruction block $A_2$.

Figure 12D:
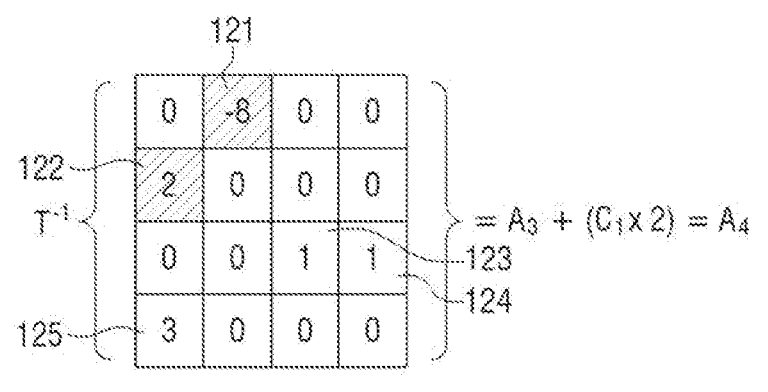

As illustrated in FIG. 12D, the inverse transformation unit 120 may generate a restoration block A4 for the code candidate group (−, +) by adding a reconstruction block obtained by multiplying each pixel value of the reconstruction block $C_1$ by two in the reconstruction block $A_3$.

That is, the candidate restoration block $A_1$ generated by inverse transforming the transform coefficient block according to the code candidate group (+, +) in the manner shown in FIGS. 12A (b), (c), (d), and candidate restoration blocks according to each of the code candidate group (+, −), (−,−), and (−, +) can be generated using $C_1$ and $C_2$ which are calculated by performing inverse transform as in the manner shown in FIGS. 12A (c), (d). Also in this embodiment, since the number of inverse transformations to be performed four times is reduced to three, the load of the encoding apparatus 100 can be reduced and the operation speed can be improved.

FIGS. 13 to 16 are views to describe a method for encoding an MVD code to a codeword according to an exemplary embodiment.

The technical idea of the present invention is that the difference between a motion vector (PMV) obtained by motion prediction and an actual motion vector (MV) is detected using a PMV as a starting point. The present invention is also applicable to a technique of compressing the sign of the calculated motion vector difference (MVD). In the intra frame compression method, the most similar predictor is generated from blocks around the image, and the residual transform is performed by subtracting the predictor generated in the current block to be encoded. The interframe compression method generates a predictor by using a previous frame or a subsequent frame as a reference frame. At this time, in the interframe compression method, the blocks are matched to determine the x and y values of the MVD for the most similar block, and the determined x and y values are transmitted to the decoder. In the method of compressing the code for the MVD value, the technical idea can be expanded.

Figure 13:
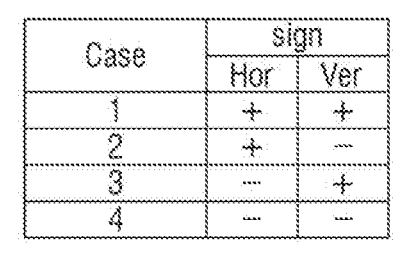
Figure 14:
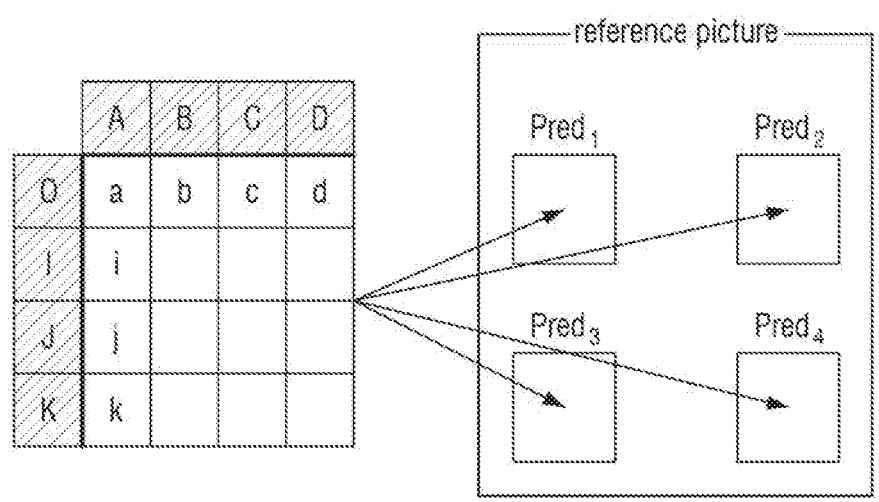

According to FIG. 13, the motion prediction unit (not shown) of the encoding apparatus 100 may generate four code candidate groups (+, +), (+, −), (−, +), and (−, −) for the MVD of the prediction unit (PU). As shown in FIG. 14, the motion prediction unit generates a total of four motion vectors by adding a predictor and a residual block referenced according to the generated plurality of code candidates, calculates a cost for each motion vector It is possible to allocate a codeword preset to the code candidate group of the smallest MVD and transmit it to the decoder together with the MVD value having no code information. The manner of calculating the cost is the same as that shown in FIGS. 7 and 8.

FIG. 15 is a view illustrating a case where the encoding unit 140 calculates the cost calculated in the prediction block corresponding to (+, +), (+, −), (−, +), and (−, −) which are combinations of codes assignable to MVD. As shown in FIG. 15, the cost calculated for the code candidate group (+, −) is the smallest at 25, and the encoding unit 140 calculates the code candidate group (+, −) having the smallest cost. It can be determined that the probability of the code information is the highest. At this time, the encoding unit 140 can sort the code candidates so that the code candidate group (+, −) having the smallest cost are arranged at the uppermost positions.

As shown in FIG. 16, the encoding unit 140 may assign a different unary code to each code candidate group. At this time, the encoding unit 140 can allocate the code word '0' to the code candidate group (+, −) having the smallest cost, and the code word '0'. Likewise, the encoding unit 140 can allocate the code word '110' to the code candidate group (−, +) having the third smallest cost, and the code word '110'. The codeword '1110' can be allocated for the code candidate group (+, +) having the largest cost. At this time, for the code candidate group (−, −), '0' may be omitted from the codeword '1110', and '111' may be allocated.

Figure 17:
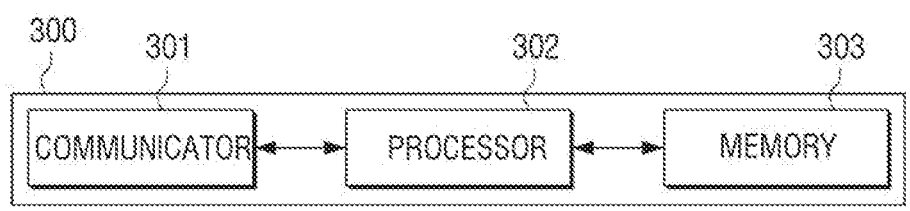
FIG. 17 is a simple block diagram of an encoding apparatus according to another exemplary embodiment.

FIG. 17 is a simplified block diagram of an encoding apparatus according to another exemplary embodiment.

The encoding apparatus 100 according to another exemplary embodiment may include a communication unit 301, a processor 302, and a memory 303.

The communication unit 301 may include a Wi-Fi chip, a Bluetooth chip, a wireless communication chip, and the like. The encoding apparatus 300 may communicate with an external apparatus including the decoding apparatus 400 through the communication unit 301. In particular, the communication unit 301 can transmit the encoded bit stream to the decoding apparatus 200.

The memory 303 may store an encoding application. In particular, memory 303 may include a computer program or application that includes commands that configure processor 302 to perform the steps or operations as described herein. For example, the encoding application may encode the bitstream and output the encoded bitstream according to the codeword allocation process described herein. The encoding application may use one or more of the processors described herein to entropy-encode the input sequence and output the bitstream. The encoding application may be stored on a computer readable medium, such as a compact disk, a flash memory device, a random access memory, and a hard drive.

Figure 18:
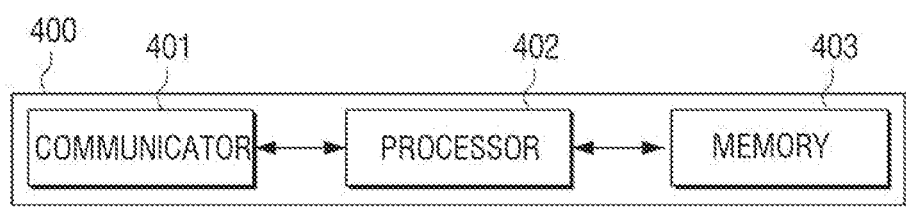
FIG. 18 is a simple block diagram of a decoding apparatus according to another exemplary embodiment.

FIG. 18 is a simplified block diagram of a decoding apparatus according to another exemplary embodiment.

The decoding device 400 according to another exemplary embodiment may include a communication unit 401, a processor 402, and a memory 403.

In the same manner as the encoding apparatus 300, the communication unit 401 may communicate with an external device according to various types of communication methods, and may receive bitstream from the encoding apparatus 300

The memory 403 may include a computer program or application that includes commands that configure the processor 402 to perform the steps or operations as described herein. For example, the decoding application may receive a bitstream that is encoded according to the codeword allocation process described herein, and may parse the encoded codeword to decode the bitstream, as described herein. The sign of the non-zero transform coefficients of the plurality of pixels can be determined according to the candidate group to which the code word corresponding to the parsed code word is assigned. The decoding application may be stored on a computer readable medium, such as a compact disk, a flash memory device, a random access memory, and a hard drive.

Figure 19:
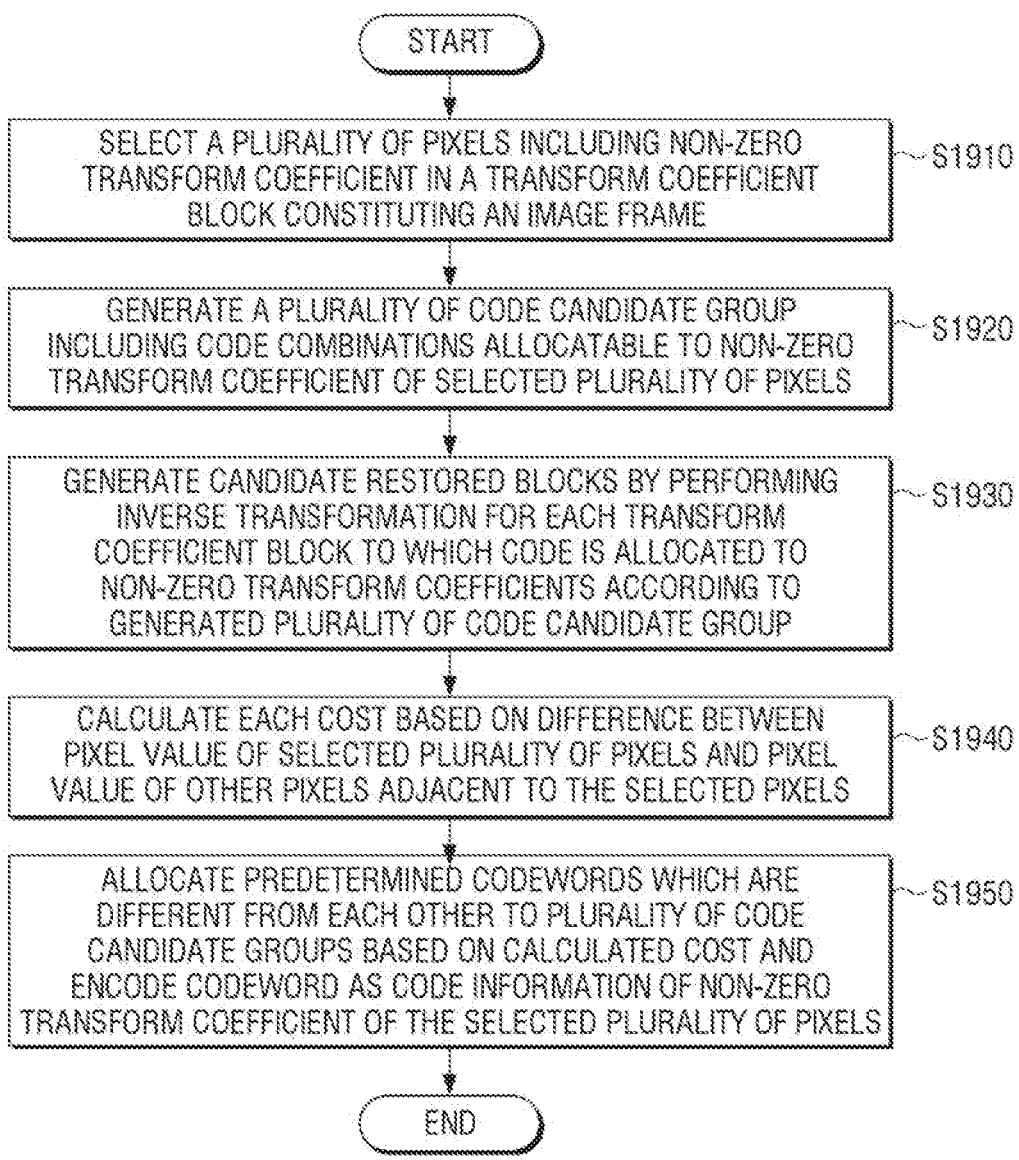
FIG. 19 is a flowchart to describe an encoding method according to an exemplary embodiment.

FIG. 19 is a flowchart to describe an encoding method according to an exemplary embodiment.

First, in the transform coefficient block constituting the image frame, a plurality of pixels including non-zero transform coefficients are selected (S1910). At this time, it is possible to select a predetermined number of pixels in a decreasing order of the transform coefficient value in the predetermined area among the transform coefficient blocks constituting the image frame.

Thereafter, a plurality of code candidate groups including code combinations assignable to the non-zero transform coefficients of the selected plurality of pixels are generated (S1920).

Thereafter, inverse transform is performed on each transform coefficient block to which the sign is assigned to the non-zero transform coefficients according to the generated plurality of code candidates, thereby generating candidate reconstructed blocks (S1930). In this case, as an example of generating the candidate reconstruction blocks, a reconstruction block in which an inverse transform is performed for each block where transform coefficients included in remaining pixels other than each of the selected pixel from among the transform coefficient block are replaced with zero and restoration block in which inverse transform is performed on a block where all the selected pixels from among the transformed coefficient block are replaced with zero are generated. The candidate reconstruction block can be generated through the sum or difference of the reconstructed blocks generated.

Thereafter, the cost is calculated based on the difference between the pixel value of the selected plurality of pixels and the pixel value of another pixel adjacent to the selected plurality of pixels (S1940). At this time, the cost may be a boundary matching cost based on a difference between pixel values of a plurality of pixels selected from the candidate restoration blocks and pixel values of other pixels in pre-restored another block adjacent to the selected plurality of pixels. Alternatively, the cost may be a variance cost based on the pixel value difference between adjacent pixels within the candidate reconstruction block.

Thereafter, a predetermined codeword is allocated to a plurality of code candidates based on the calculated cost, and one code word among the code words is encoded into code information of non-zero transform coefficients of the selected plurality of pixels (S1950). At this time, a code word having the smallest number of bits is assigned to the candidate group having the smallest cost among the plurality of candidate groups, and a code word having the smallest number of bits is allocated to the non-zero transform coefficient can be encoded with the code information of the codes. According to one embodiment, a codeword '0' may be assigned to a candidate group having the smallest cost.

The aforementioned controlling method according to the various exemplary embodiments can be realized as a program and stored in various recording medium. That is, a computer program which is processed by various processes and can execute the controlling method can be stored in a recordable medium for use.

In one example, provided is a non-transitory computer readable medium in a transform coefficient block constituting an image frame, which performs the steps of: selecting a plurality of pixels including non-zero transform coefficients, generating a candidate block including a plurality of combinations including code combinations assignable to non-zero transform coefficients of a selected plurality of pixels, generating inverse transformed blocks for each transform coefficient block to which the code is assigned to the non-zero transform coefficients according to the generated plurality of code candidate groups, calculating a cost based on a difference between pixel values of a plurality of pixels selected from among the restoration blocks and pixel values between other pixels adjacent to the selected plurality of pixels and calculating a cost for each of the plurality of code candidates based on the calculated cost, assigning one codeword among the codewords as sign information of non-zero transform coefficients of the selected plurality of pixels, and encoding one codeword from among the codewords to encoding information of the non-zero transform coefficients of the selected plurality of pixels.

The non-transitory computer-recordable medium is not a medium configured to temporarily store data such as a register, a cache, or a memory but an apparatus-readable medium configured to semi-permanently store data. Specifically, the above-described various applications or programs may be stored in the non-transitory apparatus-readable medium such as a compact disc (CD), a digital versatile disc (DVD), a hard disc, a Blu-ray disc, a universal serial bus (USB), a memory card, or a read only memory (ROM), and provided therein.

The foregoing exemplary embodiments and advantages are merely exemplary and are not to be construed as limiting the inventive concept. The exemplary embodiments may be readily applied to other types of device or apparatus. Also, the description of the exemplary embodiments is intended to be illustrative, and not to limit the scope of the inventive concept, and many alternatives, modifications, and variations will be apparent to those skilled in the art.

What is claimed is:

1. An encoding apparatus for encoding a bitstream including an image frame, the encoding apparatus comprising:
a selection unit configured to select a plurality of pixels including non-zero transform coefficients in a transform coefficient block constituting an image frame;
an inverse transformation unit configured to assign a sign to the non-zero transform coefficients, and generate candidate reconstruction blocks by performing an inverse transform on each of the transform coefficient blocks in which the sign is assigned;
a cost calculation unit configured to calculate a cost corresponding to each of the candidate reconstruction blocks based on pixel values of the selected plurality of pixels and pixel values of other pixels adjacent to the selected plurality of pixels; and
an encoding unit configured to assign predetermined codewords to the plurality of candidate reconstruction blocks based on the calculated cost, and encode one codeword among the assigned codewords based on a bit size of the assigned codewords.

2. The encoding apparatus of claim 1, wherein the selection unit selects a predetermined number of pixels in a decreasing order of a transform coefficient value from among the transform coefficient block constituting the image frame.

3. The encoding apparatus of claim 1, wherein the encoding unit allocates a codeword constituting a smallest bits from among the predetermined codeword for a code group having a small cost, and encodes a codeword composed of the smallest bits to encoding information of non-zero transform coefficients included in each pixel.

4. The encoding apparatus of claim 3, wherein the encoding unit allocates codeword '0' to a candidate group having the smallest cost.

5. The encoding apparatus of claim 1, wherein the inverse transformation unit generates a restoration block in which an inverse transform is performed for each block where transform coefficients included in remaining pixels other than each of the selected pixel from among the transform coefficient blocks are replaced with zero and a restoration block in which inverse transform is performed on a block where all the selected pixels from among the transformed coefficient block are replaced with zero, and generates a candidate reconstruction block through the sum or difference of the restoration blocks generated.

6. The encoding apparatus of claim 1, wherein the cost calculation unit calculates boundary matching cost based on a difference between pixel values of a plurality of pixels selected from the candidate reconstruction blocks and pixel values of other pixels in pre-restored another block adjacent to the selected plurality of pixels.

7. The encoding apparatus of claim 1, wherein the cost calculation unit calculates a variance cost based on the pixel value difference between adjacent pixels within the candidate reconstruction block.

8. An encoding method comprising:
selecting a plurality of pixels including non-zero transform coefficients in a transform coefficient block constituting an image frame;
assigning a sign to the non-zero transform coefficients;
generating candidate reconstruction blocks by performing an inverse transform on each of the transform coefficient blocks in which the sign is assigned to;
calculating a cost corresponding to each of the candidate reconstruction blocks pixel values of the selected plurality of pixels and pixel values of other pixels adjacent to the selected plurality of pixels; and
assigning predetermined codewords to the plurality of candidate reconstruction blocks based on the calculated cost and encoding one codeword among the codewords based on a bit size of the assigned codewords.

9. The method of claim 8, wherein the selecting comprises selecting a predetermined number of pixels in a decreasing order of a transform coefficient value from among the transform coefficient block constituting the image frame.

10. The method of claim 8, wherein the encoding comprises allocating a codeword constituting a smallest bits from among the predetermined codeword for a code group having a small cost, and encoding a codeword composed of the smallest bits to encoding information of non-zero transform coefficients included in each pixel.

11. The method of claim 10, wherein the encoding comprises allocating codeword '0' to a candidate group having the smallest cost.

12. The method of claim 8, wherein the generating comprises:
generating a restoration block in which inverse transform is performed for each block where transform coefficients included in remaining pixels other than each of the selected pixel from among the transform coefficient blocks are replaced with zero and a restoration block in which inverse transform is performed on a block where all the selected pixels from among the transformed coefficient block are replaced with zero; and
generating a candidate reconstruction block through the sum or difference of the reconstructed blocks generated.

13. The method of claim 8, wherein the calculating comprises calculating boundary matching cost based on a difference between pixel values of a plurality of pixels selected from the candidate reconstruction blocks and pixel values of other pixels in pre-restored another block adjacent to the selected plurality of pixels.

14. The method of claim 8, wherein the calculating comprises calculating a variance cost based on the pixel value difference between adjacent pixels within the candidate reconstruction block.

15. A decoding apparatus for decoding a bitstream including an image frame, the decoding apparatus comprising:
a parsing unit configured to parse a codeword encoded with sign information of non-zero transform coefficients included in a plurality of pixels selected from a transform coefficient block constituting an image frame;
a selection unit configured to select a plurality of pixels to be decoded in a transform coefficient block constituting an image frame;
an inverse transformation unit configured to assign a sign to the non-zero transform coefficients, and generate candidate reconstruction blocks by performing an inverse transform on each of the transform coefficient blocks in which the sign is assigned;
a cost calculation unit configured to calculate a cost corresponding to each of the generated candidate reconstruction blocks based on pixel values of the selected plurality of pixels and pixel values of other pixels adjacent to the selected plurality of pixels; and a decoding unit configured to allocate predetermined codewords to the plurality of candidate reconstruction blocks based on the calculated cost, and determine a sign of the non-zero transform coefficients of the selected plurality of pixels according to a sign to which a codeword corresponding to the parsed codeword is allocated.

\* \* \* \* \*